US012636626B2

(12) United States Patent
Stangassinger et al.

(10) Patent No.: US 12,636,626 B2
(45) Date of Patent: May 26, 2026

(54) MICROFLUIDIC MIXER

(71) Applicant: STRATEC CONSUMABLES GMBH, Anif (AT)

(72) Inventors: Matthias Stangassinger, Bad Duerrnberg (AT); Michael Schmid, Hallein (AT); Daniel Horner, Anthering (AT); Alfred Paris, Salzburg (AT)

(73) Assignee: STRATEC CONSUMABLES GMBH, Anif (AT)

( * ) Notice: Subject to any disclaimer, the term of this patent is extended or adjusted under 35 U.S.C. 154(b) by 770 days.

(21) Appl. No.: 17/940,443

(22) Filed: Sep. 8, 2022

(65) Prior Publication Data

US 2023/0122655 A1 Apr. 20, 2023

(30) Foreign Application Priority Data

Oct. 14, 2021 (LU) ........................................ 102865

(51) Int. Cl.
*B01F 33/301* (2022.01)
*B01F 31/31* (2022.01)
(Continued)

(52) U.S. Cl.
CPC .......... *B01F 33/3017* (2022.01); *B01F 31/31* (2022.01); *B01F 31/441* (2022.01); *B01F 2101/23* (2022.01)

(58) Field of Classification Search
CPC ...... B01F 35/717611; B01L 2400/0481; B01L 2400/0655
See application file for complete search history.

(56) References Cited

U.S. PATENT DOCUMENTS 5,595,712 A * 1/1997 Harbster .............. B01F 25/422 156/290
2003/0107946 A1 6/2003 Cosby et al.
(Continued)

FOREIGN PATENT DOCUMENTS

CN 112269023 A * 1/2021 ....... G01N 33/56966
WO 2004/073863 A2 9/2004

*Primary Examiner* — Claire X Wang
*Assistant Examiner* — Patrick M McCarty
(74) *Attorney, Agent, or Firm* — William Gray Mitchell

(57) ABSTRACT

A microfluidic mixer, formed by two parts, a first part being a substrate having formations defining fluid channels on an outer surface that is directed towards a second part, which is a flexible layer. The flexile layer has formations defining a fluid channel which, when the flexible layer is positioned over the substrate so as to cover the fluid channels of the substrate provides a fluid communication path. A section of said communication path comprises at least first and second fluid channels for providing first and second fluids. The first and second fluid channels merge before an inlet of a mixing chamber. The mixing chamber comprises perturbation formations. An outlet of the mixing chamber is connected to an outlet fluid channel. The flexible layer comprises points for compression at the inlet and outlet of the mixing chamber for closing the merged fluid channel. The perturbation formations of the mixing chamber are vertically arranged vertically with respect to an inner surface.

12 Claims, 8 Drawing Sheets

(51) Int. Cl.
*B01F 31/441* (2022.01)
*B01F 101/23* (2022.01)

(56) References Cited

U.S. PATENT DOCUMENTS

| | | | | |
|---|---|---|---|---|
| 2005/0161326 | A1* | 7/2005 | Morita | G01N 27/44704<br>204/600 |
| 2005/0272144 | A1* | 12/2005 | Sando | B01F 25/433<br>435/303.1 |
| 2007/0068964 | A1* | 3/2007 | Tanaami | B01F 25/43231<br>222/145.6 |
| 2010/0075109 | A1* | 3/2010 | Takagi | B01F 33/30<br>428/167 |
| 2010/0126927 | A1* | 5/2010 | Blankenstein | B81C 1/00119<br>156/60 |
| 2013/0264205 | A1 | 10/2013 | Hwang et al. | |
| 2015/0314223 | A1* | 11/2015 | Landers | B01L 3/502715<br>210/739 |
| 2015/0367344 | A1* | 12/2015 | Kumaran | B01L 3/502746<br>422/502 |
| 2017/0152081 | A1* | 6/2017 | Crivelli | B01L 3/502715 |
| 2018/0008946 | A1* | 1/2018 | Macedo | A45D 44/00 |
| 2018/0193831 | A1* | 7/2018 | Hopper | F04B 43/00 |
| 2020/0164367 | A1* | 5/2020 | Wunsch | B01L 3/50273 |
| 2021/0170392 | A1* | 6/2021 | Hama | B01L 3/502 |

* cited by examiner

MICROFLUIDIC MIXER

CROSS-REFERENCE TO RELATED APPLICATIONS

The present application claims priority to Luxembourg Patent Application No. LU 102865 filed on Oct. 14, 2021. The aforementioned application is hereby incorporated by reference in its entirety.

BACKGROUND OF THE INVENTION

Field of the Invention

The invention relates to a mixer for fluids in a microfluidic device.

Brief Description of the Related Art

Microfluidic devices for use in clinical diagnostics and life sciences are produced by a number of companies. For example, STRATEC® Consumables GmbH, Anif, Austria, produces a number of devices for specimen handling and detection for use in automated analyser systems and other laboratory instrumentation.

Microfluidic devices are used for fluid manipulation at a small scale, typically characterised by fluid volumes measured in μL (microlitres). In a microfluidic device, fluids are manipulated within microfluidic channels or other formations, typically being formations provided in a structure of one or more layers by an etching, moulding, laser cutting, milling, hot embossing or lithographic process.

Microfluidic devices comprise a system of microfluidic channel. In such a microfluidic channel system, mixing two liquids may be challenging, because the laminar flow is prevalent, and liquids that are joined by a Y-junction from separate inlets for instance may not mix but remain adjacent in the channel, even if structures are present in the channels and/or chambers that are supposed to perturb the laminar flow.

Lee and colleagues (Lee et al., Int J Mol Sci, 2011, 12(5), p. 3263-3287) describe in their review relating to microfluidic mixing that the aim of microfluidic mixing is to achieve a thorough and rapid mixing of multiple samples in microscale devices. In known devices, sample mixing is essentially achieved by enhancing the diffusion effect between the different species flows. Broadly speaking, microfluidic mixing schemes can be categorized as either "active", where an external energy force is applied to perturb the sample species, or "passive", where the contact area and contact time of the species samples are increased through specifically designed microchannel configurations.

If the mixing should be performed "passively," i.e., only driven by the liquid flow and the geometric structure of the channels and chambers, the needed mixing length is usually rather large, which needs large footprint on the device. In order to shorten the mixing length, more complicated structures and 3D structures are being proposed, which are more difficult to manufacture. Some structures need multiple layer lamination for the manufacturing.

Other mixing techniques rely on external actuation. Several actuation methods are described, but most of them need special actuators. Active mixers typically use acoustic/ultrasonic, dielectrophoretic, electrokinetic time-pulse, pressure perturbation, electro-hydrodynamic, magnetic or thermal techniques to enhance the mixing performance (comp. FIG. 1 of Lee et al., Int J Mol Sci, 2011, 12(5), p. 3263-3287). This document does not relate to a mechanical actuation for mixing fluids.

Flexible materials were usually either casted (e.g., polydimethylsiloxane (PDMS)) or hot embossed, both methods do not scale well for mass manufacturing (i.e., high cost). With the use of injection molding of flexible materials e.g., thermoplastic elastomers (TPE), this can be scaled into mass manufacturing.

Published European Patent application EP 3 270 018 A1 discloses a micro fluidic flow controller which comprises a substrate having formations defining two or more fluid channels having channel fluid ports which are open at an outer surface of the substrate; and a flexible layer having formations defining a fluid channel which, when the flexible layer is positioned over the substrate so as to cover at least the channel fluid ports, provides a fluid communication path between the channel fluid ports but which, when a force is applied to press the flexible layer towards the substrate, deforms so as to inhibit fluid communication between the channel fluid ports. The disclosed device provides only means for flow control but not for mixing fluids.

Published U.S. patent application US 2013/264205 A1 relates to a the microfluidic device which comprises a first chamber with at least one inlet and at least one outlet; a second chamber operatively connected with a pressure supply unit; and an elastic membrane disposed between the first chamber and the second chamber and forming a wall of at least part of the first and second chambers, wherein the first chamber comprises or contains a material that binds to a target material.

Published International patent application WO 2004/073863 A2 discloses Method and apparatus for performing controlled performance of reactions, the apparatus comprising at least one channel for receiving a substance, the channel having a first end and a second end, and at least one treatment zone intermediates the first end and second end of the channel, for performing a treatment on substance in the channel(s). Means are provided for applying a pump action to the channel(s), the pump action in use causing substance within the channel(s) to pass back and forth over the treatment zone(s).

Published U.S. patent application US 2003/107946 A1 teaches a cover slip mixing apparatus having a support and a flexible cover slip positioned over and forming a chamber between the support and the cover slip. A device is positioned with respect to the support and cover slip for applying a force on the cover slip and flexing the cover slip toward the support, the flexing cover slip providing a mixing action of a material located in the chamber. A microfluidic device includes a substrate with a fluid path disposed in the substrate. A flexible cover is positioned over the substrate and the fluid path, and a device is positioned with respect to the substrate and the cover. The device is operable to apply forces to the cover and flex the cover to act on fluid in the fluid path.

SUMMARY OF THE INVENTION

It is therefore the object of this invention to provide a device and a method for improving mixing of fluids in a microfluidic device.

The present invention provides a microfluidic mixer, formed by two parts, a first part being a substrate having formations defining fluid channels on an outer surface that is directed towards a second part, which is a flexible layer, wherein the flexile layer has formations defining fluid channel which, when the flexible layer is positioned over the substrate so as to cover the fluid channels of the substrate to provide a fluid communication path, wherein a section of said communication path comprises at least a first and a second fluid channel for providing a first and a second fluid, wherein first and second fluid channel merge before an inlet of a mixing chamber into a merged fluid channel, wherein the mixing chamber comprises perturbation formations, and an outlet of the mixing chamber is connected to an outlet fluid channel, wherein the flexible layer comprises points for compression at the inlet and outlet of the mixing chamber for closing the merged fluid channel and the outlet fluid channel connected to inlet and outlet of the mixing chamber characterized in that perturbation formations of the mixing chamber are vertically arranged walls, pillars, or tubes with respect to an inner surface.

Another aspect of the invention relates to perturbation formations in the mixing chamber which are arranged perpendicularly with respect to the flow direction of a fluid and the formations are connected to at least one inner surface of the mixing chamber.

It may further be intended that the section comprising the mixing chamber has on both sides actuation member for deforming the flexible layer.

In another aspect of the present invention, further channels formed by substrate and flexible layer may merge before the inlet of the mixing chamber into the merged fluid channel.

The microfluidic mixer according to the present invention may also comprise an outlet fluid channel that diverges into a plurality of channels.

Another embodiment of a microfluidic mixer according to the present invention may comprise a substrate that is made of a rigid material.

Another object of the present invention is a microfluidic device comprising at least one microfluidic mixer as described above.

A further object of the present invention relates to a system comprising a microfluidic device comprising a microfluidic mixer as described in more detail above and at least one mechanical actuator which are arranged above the points of compression of a microfluidic mixer at its inlet and outlet.

Another object of the present invention is a method for mixing a fluid in a microfluidic device, comprising the steps of

- applying at least two different liquids for mixing in a first and a second fluid channel in a microfluidic mixer, formed by two parts, a first part being a substrate having formations defining fluid channels on an outer surface that is directed towards a second part, which is a flexible layer, wherein the flexile layer has formations defining first and second fluid channel which, when the flexible layer is positioned over the substrate so as to cover the fluid channels of the substrate to provide a fluid communication path, wherein in a section of said communication path the first and second fluid channel merge before an inlet of a mixing chamber into a merged fluid channel, wherein the mixing chamber comprises perturbation formations, characterized in that perturbation formations of the mixing chamber are vertically arranged walls, pillars, or tubes with respect to an inner surface, and an outlet of the mixing chamber is connected to an outlet fluid channel,
- applying at least once a mechanical pressure at points for compression at the inlet and outlet of the mixing chamber for closing the channels connected to inlet and outlet of the mixing chamber;
- releasing the mechanical pressure so that the mixed fluids can leave the mixing chamber through the outlet.

The method may further encompass that the mechanical force to the points of compression is applied in parallel to both points of compression.

In another aspect of the method according to the present invention, a mechanical actuator is used for applying the mechanical force to the points of compression.

The methods may also comprise a step, wherein the points of compression are sidewise actuated after applying the mechanical force.

Still other aspects, features, and advantages of the present invention are readily apparent from the following detailed description, simply by illustrating preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE FIGURES

A more complete appreciation of the disclosure and many of the attendant advantages thereof will be readily obtained as the same becomes better understood by reference to the following detailed description of embodiments, when considered in connection with the accompanying drawings, wherein.

DETAILED DESCRIPTION OF THE INVENTION

Figure 1:
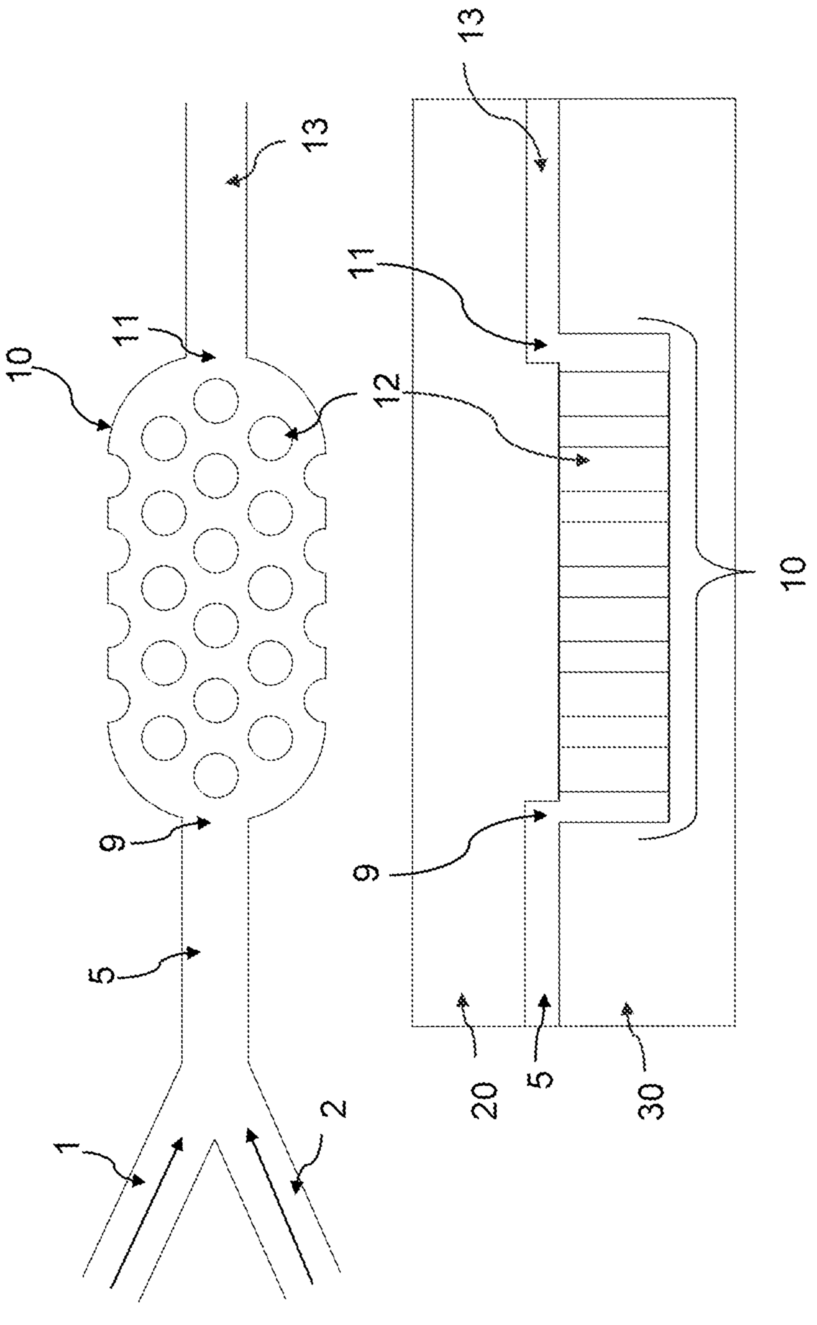
FIG. 1 shows a schematic top view onto merging channels before a mixing chamber.

The technical problem is solved by the independent claims. The dependent claims cover further specific embodiments of the invention.

The microfluidic device according to the present disclosure relates to the channels of a microfluidic device which are formed in a flexible layer, which can be mechanically closed by a pair of actuators for example to enclose the two liquids that should be mixed in a section between the two points of closure which can be a mixing chamber.

By moving the pair of actuators horizontally along or into the flexible channels, a "peristaltic" movement is generated, that will agitate the liquid. Perturbation structures in the mixing channel or chamber, together with the movement, will enable a fast and efficient mixing.

In addition, in an aspect of the device according to the present disclosure, the structure can be manufactured in high volume by injection molding, because only two layers are required.

A microfluidic device according to the present disclosure thus comprises a microfluidic mixer which is formed between two layers: a bottom layer, which can be of rigid or flexible material, and a top layer, which is made of a flexible material. Between the layers, channels and optional chambers are formed. Via two channels, two or more liquids that should be mixed are delivered and merged into one channel. A larger chamber can be formed in this single channel, with or without perturbation structures (e.g., pillars, tubes etc.).

Before and after the mixing volume in a mixing chamber, sections are provided for mechanical actuation. The actuation shall squeeze the channels and thereby enclose the liquid plug (containing the liquids to be mixed). By horizontal movement at the sections for mechanical movement, e.g., by rolling back and forth, a movement is introduced in the liquids to be mixed which enables faster and more efficient mixing, rather than relying only on diffusion or passive mixing.

Any elastomeric material can be used for the flexible layer, as long as it fulfils all related requirements for the dedicated application. Examples include elastomer, silicone or natural or synthetic rubber. Depending on the material the manufacturing process for the elastomeric layer could be casting (curing/hardening by time, temperature, light, . . . ), injection molding (e.g., for TPEs) or reactive injection molding (e.g., for polyurethanes). Examples include thermoplastic elastomer (TPE) such as thermoplastic polyolefine (TPO), thermoplastic vulcanisate (TPV), thermoplastic rubber (TPR), styrene based thermoplastic (TPS), amid based thermoplastic (TPA), ester based thermoplastic (TPC), urethane based thermoplastic (TPU), any kind of silicone such as ploymethylsiloxan or any kind of natural or synthetic rubber such as nitrile butadiene rubber (NBR), fluorine rubber (FKM), ethylene propylene diene monomer rubber (EPDM), styrene ethylene butadiene styrene (SEBS) or the like.

The substrate may be formed of, for example, at least one of: a polymeric material; a material selected from glass, quartz, silicon nitride, and silicon oxide, polyolefins, polyethers, polyesters, polyamides, polyimides, polyvinylchlorides, polyacrylates; including their modifications, derivatives and copolymers; more specifically (by way of example) one of the list containing acrylnitril-butadien-styrole (ABS), cyclo-olefin-polymers and copolymers (COC/COP), Polymethylene-methacrylate (PMMA), Polycarbonate (PC), Polystyrole (PS), Polypropylene (PP), Polyvinylchloride (PVC), Polyamide (PA), Polyethylene (PE), Polyethylene-terephthalate (PET), Polytetrafluorethylene-ethylene (PTFE), Polyoxymethylene (POM), Thermoplastic elastomers (TPE), thermoplastic polyurethane (TPU), Polyimide (PI), Polyether-ether-ketone (PEEK), Polylactic acid (PLA), polymethyl pentene (PMP) or the like.

The arrangement shown in the top part of FIG. 1 shows a first fluid channel 1 for delivering a first fluid and a second fluid channel 2 for delivering a second fluid, wherein first and second fluid channel 1, 2 merge into a single channel 5 before a mixing chamber 10 with an inlet 9 and an outlet 11. The mixing chamber 10 comprises perturbation structures 12. An outlet fluid channel 13 is arranged behind outlet 11 of the mixing chamber 10 for providing the mixed fluids for further processing in a microfluidic device.

The lower part of FIG. 1 shows a central sectional view of the top part of FIG. 1 beginning with the merged fluid channel 5 on the left side. The microfluidic device is formed by two parts, a flexible layer 20 which is arranged on top of a substrate 30. Formations between the two parts define fluid channels like the merged fluid channel 5 which is connected to the inlet 9 of the mixing chamber 10 with perturbation structures 12. An outlet fluid channel 13 is connected to the outlet 11 of the mixing chamber 10 for guiding the mixed liquids away from the mixing chamber 10.

Figure 2:
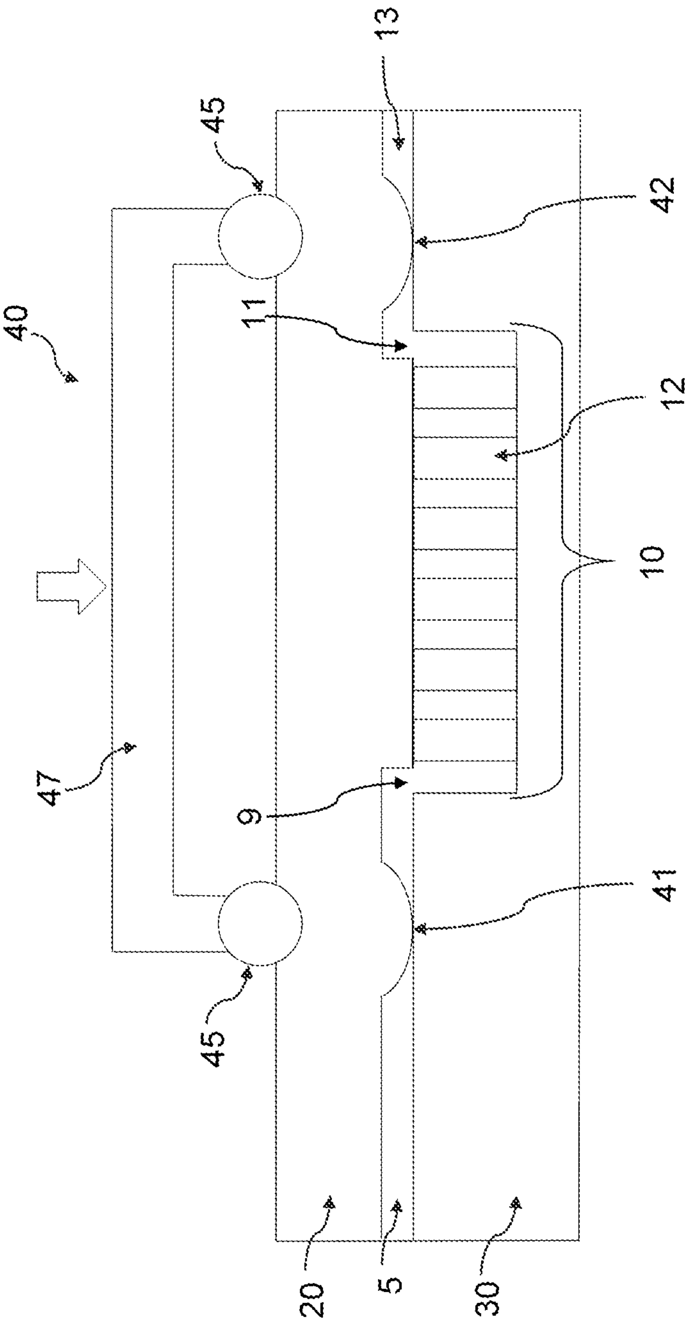
FIG. 2 shows schematically a sectional view with agitators on both sides of a mixing chamber.

FIG. 2 shows the sectional view comparable to the lower part of FIG. 1 with a mechanical actuator 40. The mixing chamber 10 with perturbation structures 12 is arranged between the merged fluid channel 5 and the outlet fluid channel 13. A mechanical force can be applied to the upper flexible layer 20 by a mechanical actuator 40 so as to deform the flexible layer 20 and thus compress the merged fluid channel 5 and the outlet fluid channel 13 such that a fluid flow between the two points of compression 41, 42 is either inhibited to flow or leave the volume between the points of compression 41, 42 or enter the volume between the points of compression 41, 42.

The mechanical actuator 40 in FIG. 2 is having two rounded pusher 45 which are linked by a connector 47. It is not necessary that pusher 45 are rounded or linked by a connector 47 but if both pushers shall be pressed in parallel into the flexible layer 20, the mechanical actuator 40 will allow to apply a force only to the connector 47 for moving the pushers 45 into the flexible layer 20. It is also within the scope of the present disclosure that the pushers 45 can be actuated independently from another.

Figure 3:
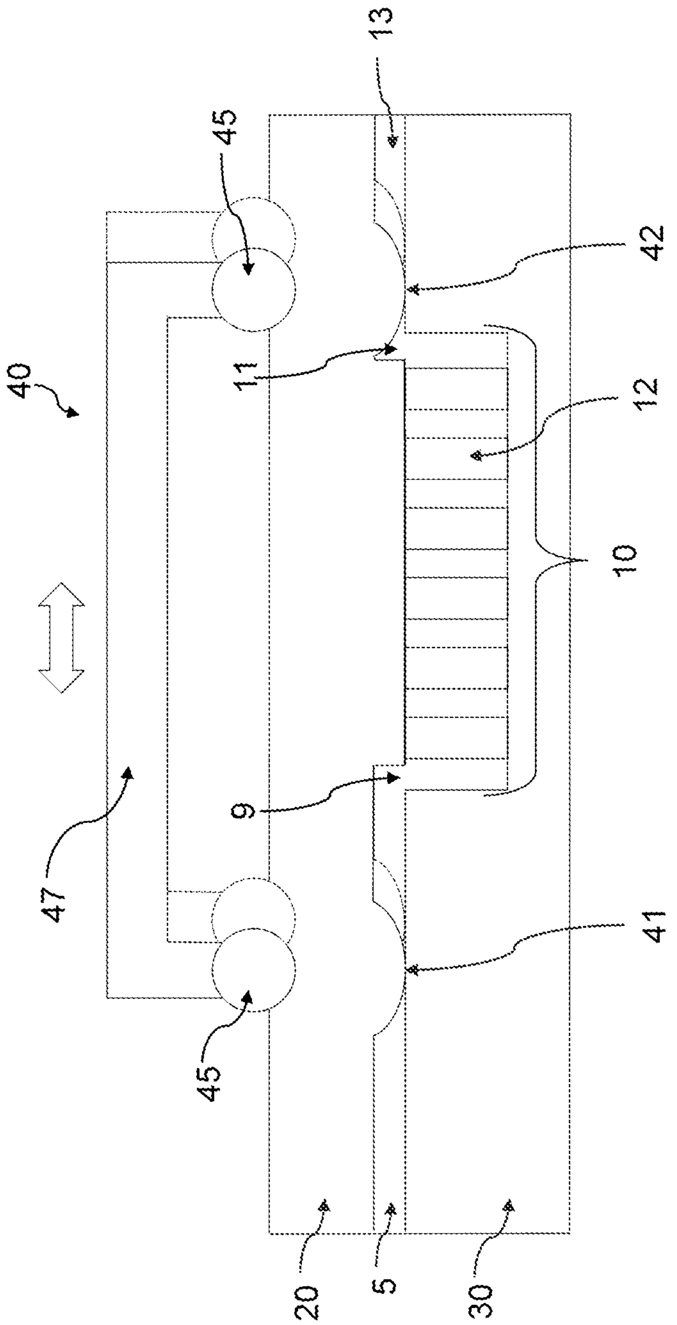
FIG. 3 shows the same view as FIG. 2, wherein the dashed line in FIG. 3 indicates that the arrangement of pusher and connector can be moved sidewise.

FIG. 3 shows the same view as FIG. 2, wherein the dashed line in FIG. 3 indicates that the arrangement of pusher 45 and connector 47 can be moved sidewise so that a movement in the liquid is initiated which is comprised between the first and second point of compression 41, 42. Even the compression of the flexible layer 20 will result in a kind of a peristaltic pressure on the liquid between the two points of compression 41, 42. A repeated sidewise movement or swinging of pusher 45 and connector 47 will enhance the movement of the liquid and thus improve mixing of different liquids forming the liquid between the points of compression 41, 42. The movement of a single one of the pushers 45 alone will also result in a movement of the fluid comprised between the points of compression 41, 42.

Figure 4:
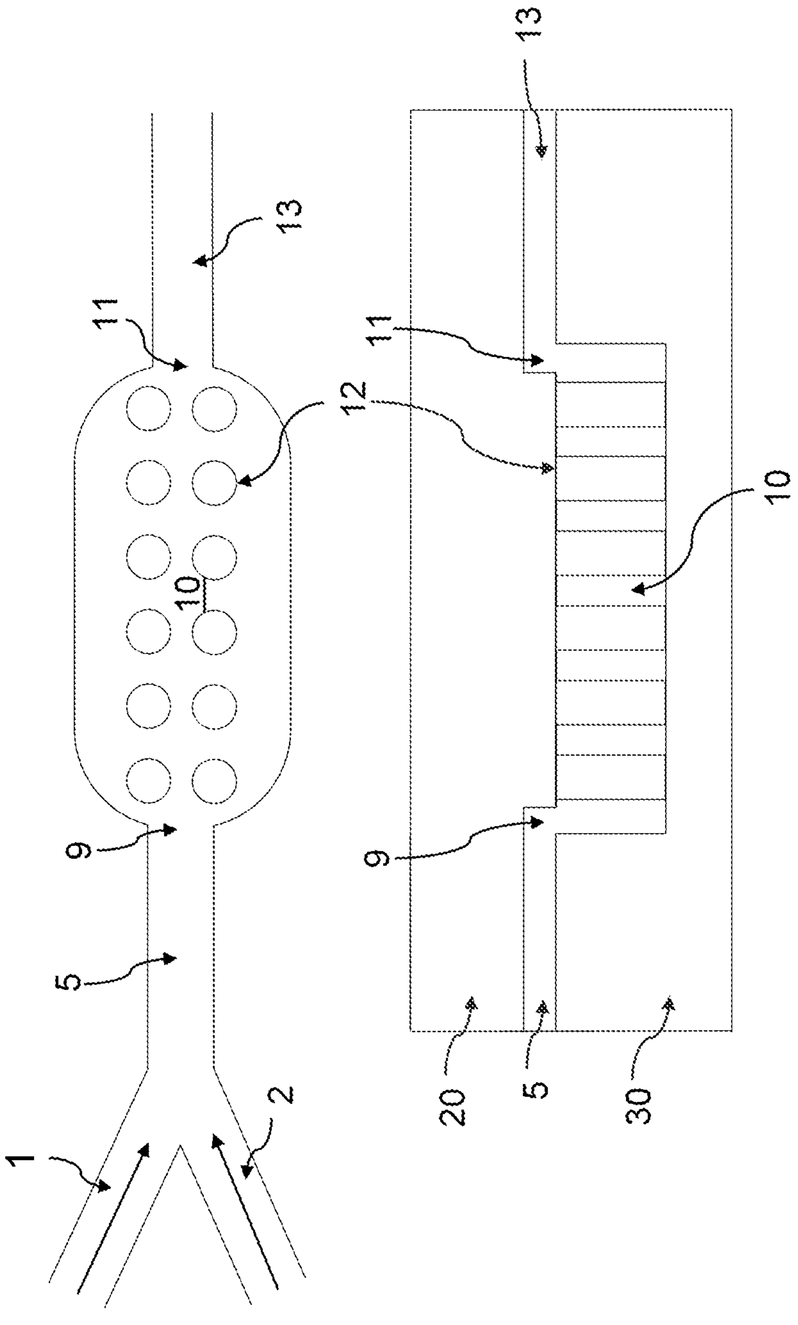
FIG. 4 shows an embodiment of the mixing chamber with perturbation structures.

FIG. 4 shows an embodiment of the mixing chamber 10 with inlet and outlet 9, 11 and surrounding channels 1, 2, 5, 13. The mixing chamber 10 in FIG. 4 comprises perturbation structures. Mixing will be achieved by compressing flexible layer 20 and possibly moving the actuator (not shown) sidewise. The mixing chamber 10 in FIG. 4 is mainly formed in substrate 30.

Figure 5:
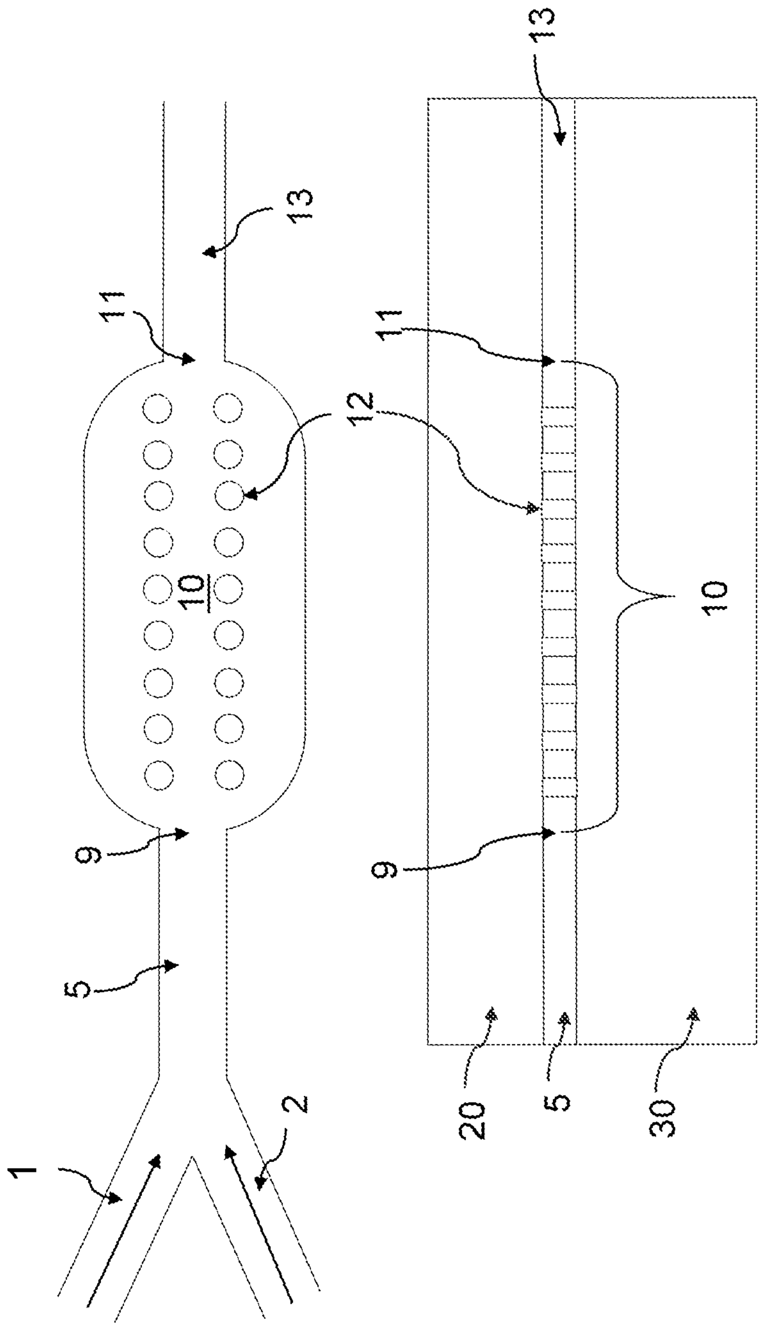
FIG. 5 shows an embodiment with a mixing chamber that extends only laterally but does not have an increased diameter.

FIG. 5 shows an embodiment of the mixing chamber 10 with inlet and outlet 9, 11 and surrounding channels 1, 2, 5, 13 with a mixing chamber 10 that extends laterally but does not have an increased diameter as can be seen in the lower part of FIG. 5.

Figure 6:
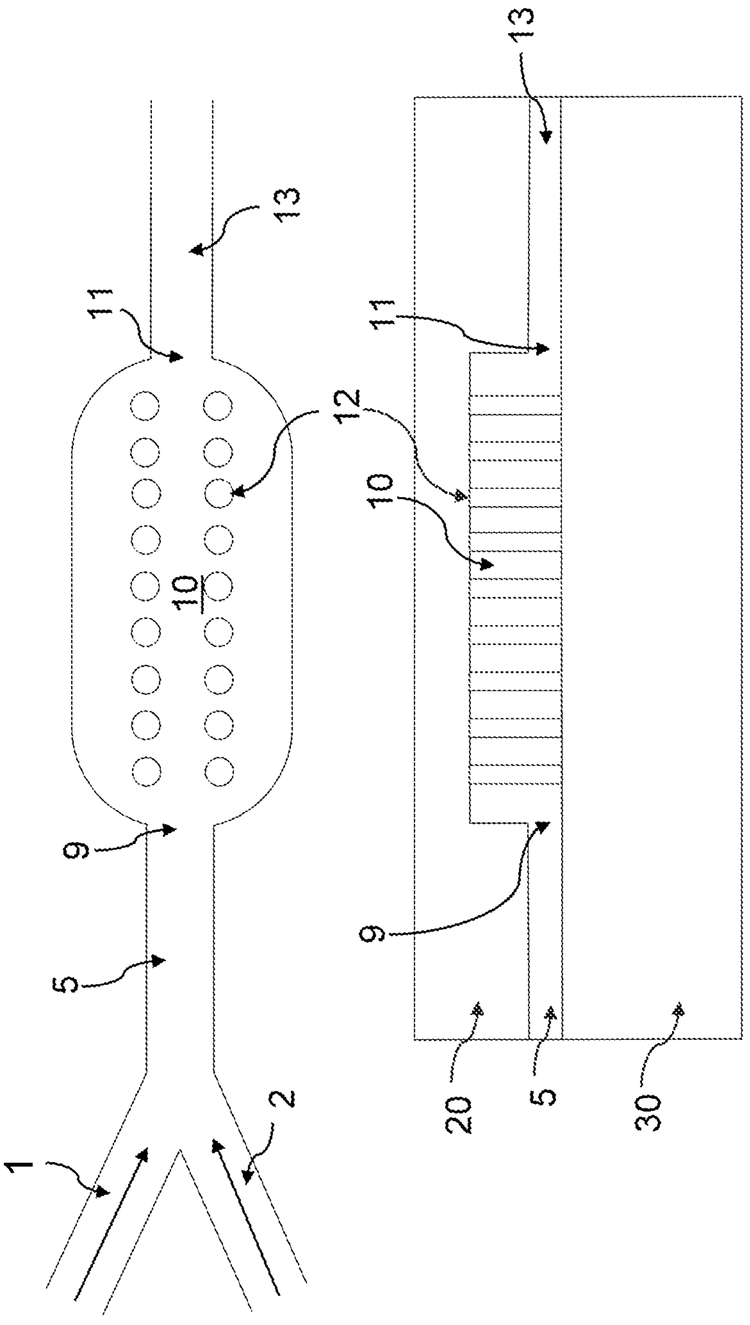
FIG. 6 shows an embodiment of the mixing chamber that is mainly formed in flexible layer.

FIG. 6 shows an embodiment of the mixing chamber 10 with inlet and outlet 9, 11 and surrounding channels 1, 2, 5, 13. The mixing chamber 10 in FIG. 6 comprises perturbation structures. Mixing will be achieved by compressing flexible layer 20 and possibly moving the actuator (not shown) sidewise. The mixing chamber 10 in FIG. 6 is mainly formed in flexible layer 20.

Figure 7:
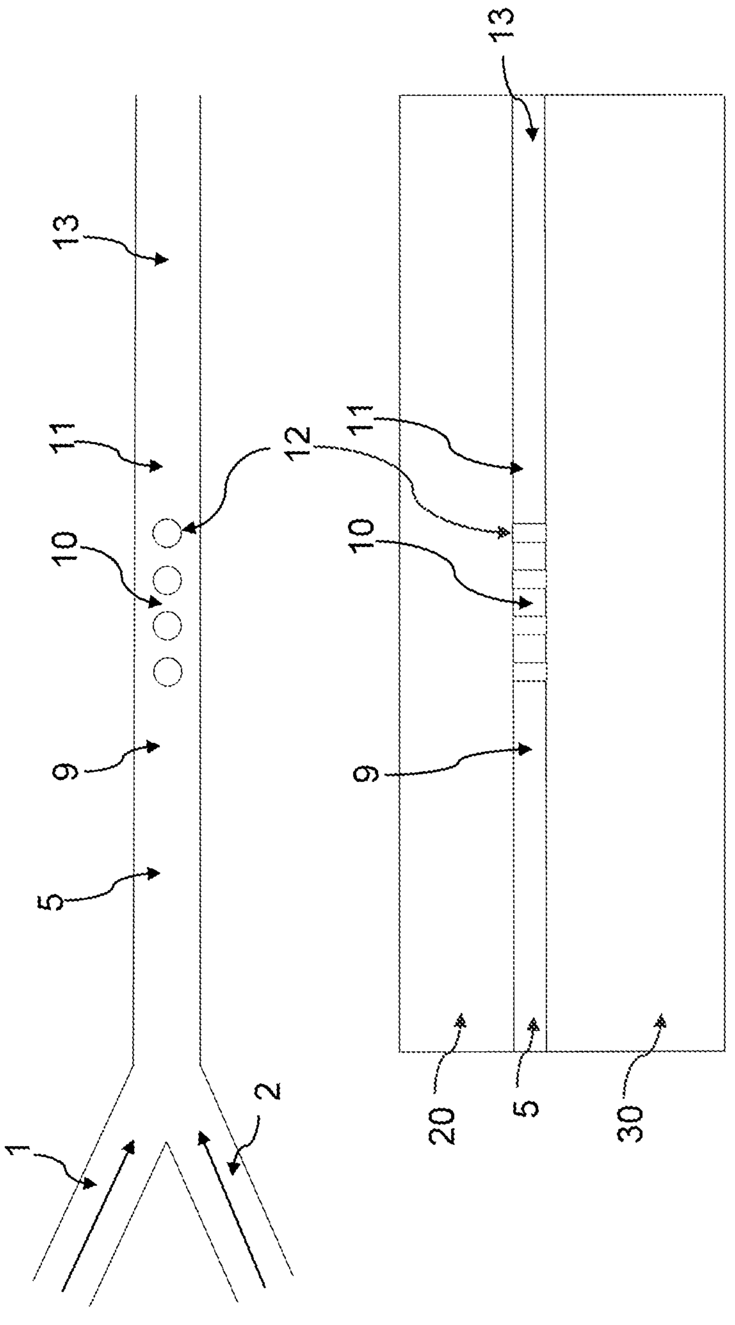
FIG. 7 shows an embodiment where the mixing chamber does not have an increased diameter in any direction.

FIG. 7 shows an embodiment where the mixing chamber 10 with inlet and outlet 9, 11 and surrounding channels 1, 2, 5, 13 with a mixing chamber 10 is simply a part of the channel and does not have an increased diameter in any direction compared to merged fluid channel 5 and outlet fluid channel 13 as can be seen in the lower part of FIG. 7.

Figure 8:
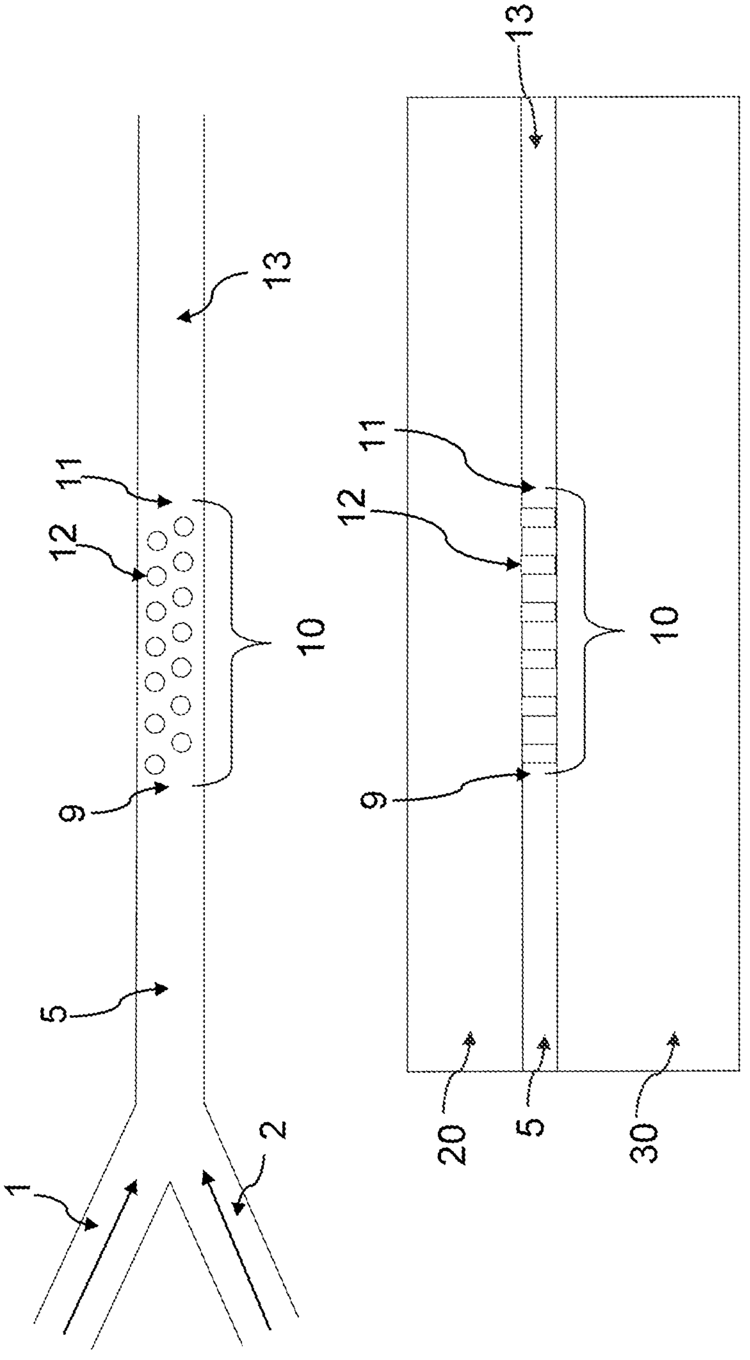
FIG. 8 shows an embodiment where the mixing chamber is simply a part of the channel system.

FIG. 8 shows an embodiment where the mixing chamber 10 with inlet and outlet 9, 11 and surrounding channels 1, 2, 5, 13 with a mixing chamber 10 is simply a part of the channel and comprises perturbation structure 12 but does not have an increased diameter in any direction compared to merged fluid channel 5 and outlet fluid channel 13 as can be seen in the lower part of FIG. 8.

The perturbation structures in the mixing chamber are intended to impede the fluid flow. For that reason, formations are envisaged which are arranged perpendicular to the fluid flow direction. The perturbation structures comprise pillars, walls or tubes which are connected to the upper or lower inner surface of the mixing chamber.

The advantages of the invention can be summarized as follows:

a. Easy to manufacture: Elastic materials (e.g., thermoplastic elastomers TPE) can be injection molded, also featuring micro-channels, chambers, and perturbation structures.
b. Only two layers are needed to form the mixing chamber.
c. Simple actuation: the actuation is performed mechanically, which is simple to implement into an instrument that drives the microfluidic device (in contrast to e.g., thermal interfaces). Means for actuation do not require a very precise alignment.
d. Mixing efficiency improved over passive structures: Mixing structures with the same footprint will enable more efficient mixing by the means of agitation. In other terms, for the same mixing efficiency, less footprint will be needed, enabling smaller devices, resulting in saving cost.
e. Minimal dead volume: In contrast to many other implementations of mixers (e.g., with side channels), a device according to the present disclosure has basically no dead volume.
f. Liquids completely enclosed: during the mixing, the liquids are completely isolated and have no direct contact to the outside environment or other parts of the instrument, which provides a good containment, and reduces thus the risk of contamination.

Alternative approaches may relate to other actuation methods employing pumps or pressure pulses, which can be used to achieve the same effect. However, such measures usually need more complicated actuators or have dead volume, or need outside contact (e.g., pressure driven systems). The most direct comparable solution are two peristaltic pump elements before and after a mixing volume or the mixing chamber, respectively.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

REFERENCE NUMERAL

1 first fluid channel
2 second fluid channel
5 merges channel
9 inlet mixing chamber
10 mixing chamber
11 outlet mixing chamber
12 perturbation structures
13 outlet fluid channel
20 flexible layer
30 substrate
40 mechanical actuator
41 first point for compression
42 second point for compression
45 pusher
47 connector

What is claimed is:

1. A microfluidic mixer, formed by two parts, a first part being a substrate having formations defining fluid channels on an outer surface that is directed towards a second part, the second part being a flexible layer, wherein the flexible layer has formations defining fluid channels which, when the flexible layer is positioned over the substrate, cover the fluid channels of the substrate to provide a fluid communication path, wherein a section of said fluid communication path comprises at least a first and a second fluid channel for providing a first and a second fluid, wherein the first and second fluid channels merge before an inlet of a mixing chamber into a merged fluid channel, wherein the mixing chamber comprises perturbation formations, and an outlet of the mixing chamber is connected to an outlet fluid channel, wherein the flexible layer comprises points for compression at the inlet and outlet of the mixing chamber for closing the merged fluid channel and the outlet fluid channel connected to the inlet and outlet of the mixing chamber such that application of pressure on the points for compression causes the mixing of at least two fluids, wherein the perturbation formations of the mixing chamber are vertically arranged walls, pillars, or tubes with respect to an inner surface of the mixing chamber.

2. The microfluidic mixer of claim 1, wherein the perturbation formations in the mixing chamber are arranged perpendicularly with respect to a flow direction of a fluid and the perturbation formations are connected to at least one inner surface of the mixing chamber.

3. The microfluidic mixer of claim 1, wherein a section comprising the mixing chamber has members on two sides for deforming the flexible layer.

4. The microfluidic mixer of claim 1, wherein further channels formed by the substrate and the flexible layer merge before the inlet of the mixing chamber into the merged fluid channel.

5. The microfluidic mixer of claim 1, wherein the outlet fluid channel diverges into a plurality of channels.

6. The microfluidic mixer of claim 1, wherein the substrate is made of a rigid material.

7. A microfluidic device comprising at least one microfluidic mixer according to claim 1.

8. A system comprising the microfluidic device according to claim 7 and at least one mechanical actuator which is arranged above the points for compression of the mixing chamber at the inlet and outlet.

9. A method for mixing a fluid in a microfluidic device, comprising the steps of:

introducing at least two different fluids for mixing in a first and a second fluid channel in a microfluidic mixer, formed by two parts, a first part being a substrate having formations defining fluid channels on an outer surface that is directed towards a second part, which is a flexible layer, wherein the flexible layer has formations defining the first and second fluid channels with the flexible layer positioned over the substrate so as to cover the fluid channels of the substrate to provide a fluid communication path, wherein in a section of said communication path the first and second fluid channels merge before an inlet of a mixing chamber into a merged fluid channel, wherein the mixing chamber comprises perturbation formations, characterized in that the perturbation formations of the mixing chamber are vertically arranged walls, pillars, or tubes with respect to an inner surface, and an outlet of the mixing chamber is connected to an outlet fluid channel, applying at least once a mechanical pressure at points for compression at the inlet and outlet of the mixing chamber for closing the channels connected to the inlet and outlet of the mixing chamber and thereby mixing the at least two different fluids; and releasing the mechanical pressure so that the mixed fluids can leave the mixing chamber through the outlet.

10. The method of claim 9, wherein the mechanical pressure to the points for compression is applied in parallel to each point of compression at the inlet and outlet.

11. The method of claim 9, wherein a mechanical actuator is used for applying the mechanical pressure to the points for compression.

12. The method of claim 9, wherein the points for compression are sidewise actuated after applying the mechanical pressure.

* * * * *